UNITED STATES PATENT OFFICE.

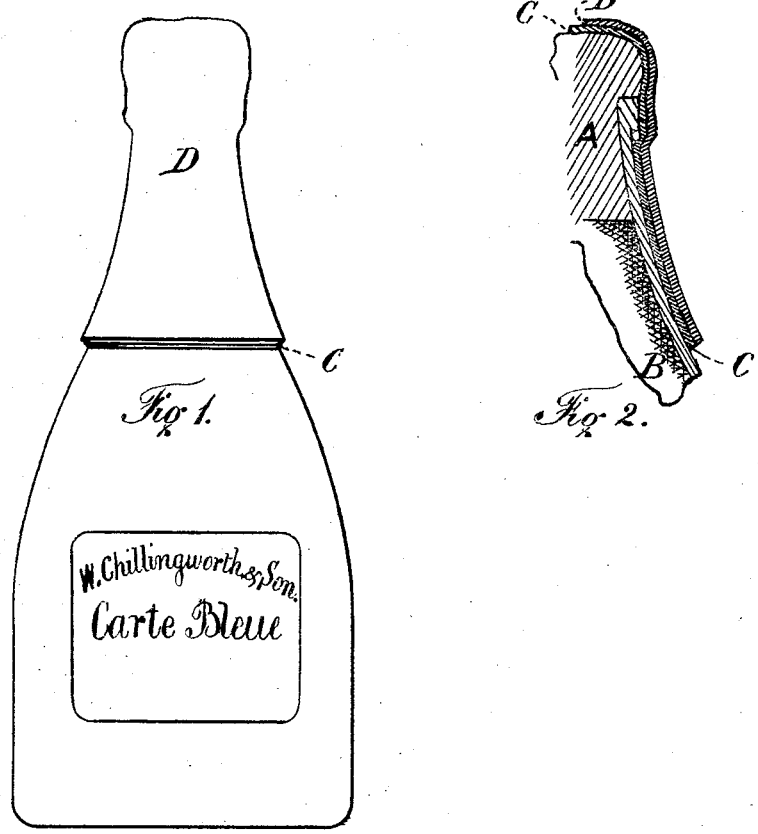
J. G. CHILLINGWORTH.
Caps or Covers for Bottles.
No. 140,346. Patented July 1, 1873.

JAMES G. CHILLINGWORTH, OF LONDON, ENGLAND.

IMPROVEMENT IN CAPS OR COVERS FOR BOTTLES.

Specification forming part of Letters Patent No. 140,346, dated July 1, 1873; application filed April 4, 1873.

*To all whom it may concern:*

Be it known that I, JAMES GUNSTON CHILLINGWORTH, of London, in the county of Middlesex, England, have invented certain new and useful Improvements in Caps or Covers for Wine and other Bottles; and I do hereby declare the following to be a full, clear, and exact description of the invention, such as will enable others skilled in the art to which it pertains to make and use it, reference being had to the accompanying drawings which form part of this specification.

Figure 1 is a front elevation of a glass bottle having my invention, and showing the manner of covering the cork and necks of bottles. Fig. 2 is a sectional elevation of my invention showing the layers of tin-foil and composition.

The nature of my invention consists in providing a ready means of opening champagne, tin-foil, or other capped bottles. Heretofore the bottle necks and corks have been covered singly with tin-foil, wax, or composition, and to open the bottle the said tin-foil, wax, or composition has to be carefully picked off, and it is almost impossible to keep dirt from getting into the liquor, especially with wax and composition. The object of my invention is to avoid loss of time and trouble in sealing and unsealing bottles.

To enable others skilled in the art to make and use my invention I will proceed to describe its construction and operation.

I cover the whole neck, cork, and wire-holders with clean tin-foil, and then dip the same into wax or other composition. A person wishing to open a bottle having my invention has merely to take hold of the wax or composition and give the same a turn or twist. The wax or composition adheres to the tin-foil better than the tin-foil to the glass or earthen bottles, and therefore the wax draws off the tin-foil cleanly from the neck of the bottle, especially around the cork.

A is the cork. B is the glass of the bottle. C is the tin-foil. D is the wax or composition.

What I claim as new, and desire to secure by Letters Patent, is—

A cap or covering for the corks of bottles, consisting of tin-foil and wax or composition, applied in the manner and for the purpose specified.

In testimony that I claim the foregoing I have hereunto set my hand this 1st day of April, 1873.

J. G. CHILLINGWORTH.

Witnesses:
R. A. GORDON,
S. S. DOAK.